United States Patent [19]

Scholz

[11] 4,106,863
[45] Aug. 15, 1978

[54] CASSETTE RECEIVING WELL STRUCTURE FOR PHOTOGRAPHIC VIEWING APPARATUS

[75] Inventor: Donald T. Scholz, Wayland, Mass.
[73] Assignee: Polaroid Corporation, Cambridge, Mass.
[21] Appl. No.: 756,430
[22] Filed: Jan. 3, 1977
[51] Int. Cl.² ............................................. G03B 23/02
[52] U.S. Cl. ........................................ 352/72; 352/130
[58] Field of Search ..................... 352/72, 74, 75, 76, 352/130

[56] References Cited

U.S. PATENT DOCUMENTS

| | | | |
|---|---|---|---|
| 1,962,031 | 6/1934 | Porter | 352/72 |
| 2,241,231 | 5/1941 | Wittel | 352/72 |
| 2,326,980 | 8/1943 | Steiner | 352/72 |
| 2,912,899 | 11/1959 | Wangerin | 352/72 |
| 3,532,292 | 10/1970 | Crandall | 352/72 |
| 3,771,861 | 11/1973 | Land | 352/72 |

Primary Examiner—Monroe H. Hayes
Attorney, Agent, or Firm—Frederick A. Goettel

[57] ABSTRACT

A cassette well structure for viewing apparatus adapted to receive a cassette for processing and projecting a photographic film strip contained in the cassette. The cassette well is defined on one side by a wall surface formed in a chassis support member on which cassette cooperative viewer components are mounted, the wall surface extending between flange formations defining well floor and end walls against which an inclined plate is secured to provide and opened top well enclosure. Cassette insertion causes the bottom wall thereof to upwardly engage biased members which operate to urge the cassette against a downwardly facing lip at the upper edge of the wall surface. Laterally acting spring means supported on the plate member loads the cassette against the same surface. Cassette ejection means moves the upper cassette portion free of the lip for ejection by the upwardly biased members. An aperture block assembly is supported on the cassette well floor and includes film engaging components retractable from an operative position with cassette carried internal components by a shiftable blinder plate.

5 Claims, 15 Drawing Figures

CASSETTE RECEIVING WELL STRUCTURE FOR PHOTOGRAPHIC VIEWING APPARATUS

BACKGROUND OF THE INVENTION

This invention relates to viewing apparatus for cassette contained motion picture film strip and more particularly, it concerns an improved cassette well structure for such apparatus and by which a multi-purpose film cassette may be inserted and retained in a proper operational orientation relative to other viewer contained components.

In the recently developed motion picture art, the term "multi-purpose film cassette" has been used to denote a generally parallelepiped housing in which a strip of light sensitive film is initially packaged along with a pod or reservoir of processing fluid such that the film strip may be exposed, processed and viewed by inserting the cassette containing the film strip in a appropriate motion picture camera, and subsequently inserting the exposed film cassette into a viewing apparatus operative to coat the exposed film strip with processing fluid to develop the conventional series of image frames for viewing by projection in a very short period of time. The film strip is connected at opposite ends to a cassette contained supply and take-up spools, the film strip being wound on the latter both during exposure in the camera and during projection in the viewing apparatus by draining the take-up spool and returned to the supply spool on rewinding as well as for processing. Such cassettes are provided with a light reflecting prism by which projection light may be directed from the reflecting surface outwardly of the cassette through the opening provided therein for exposure and projection. Exemplary disclosures of viewing apparatus for handling such cassettes are found in U.S. Pat. Nos. 3,830,564 issued Aug. 20, 1974 to John F. Batter, Jr., U.S. Pat. No. 3,909,120 issued Sept. 30, 1975 to Joseph A. Stella and U.S. Pat. No. 3,941,465 issued Mar. 2, 1976 to Irwin E. Figge, et. al.

While the cassette receiving well of such viewing apparatus represents only a part of the viewer contained equipment needed to process and project the cassette contained film strip, the nature of the general system imposes several requirements on the viewer structure defining the well. For example, the cassette and film strip must be precisely registered with the various viewer contained components operable on the film strip. Because the processing operation involves movement of a liquid processing fluid within the cassette, gravitational orientation is important. Also to accomodate processing, provision must be made for blocking the passage of light to the exposure-projection opening in the film cassette inasmuch as the film remains light sensitive until the processing fluid is actually coated thereon. The sensitivity of the system to require operating condition dictates further that the system be fully automated. Thus, it is desireable that the system operate directly in response to cassette insertion as well as eject the cassette after the completion of a projection and rewind cycle.

SUMMARY OF THE PRESENT INVENTION

In accordance with the present invention, an improved cassette well structure is provided for viewing apparatus of the type mentioned and which enables cassette insertion by simple downward depression of the cassette into a precisely registered operative position from which it may be ejected automatically. The well is preferably defined on one essentially vertical wall by a surface formed in a main support structure of the viewer on which all cassette cooperative viewer components are mounted, including a pair of cassette spool drive heads projecting from the wall surface to engage spool drive hubs recessed in a wall of the cassette. The drive heads are situated between a pair of upwardly biased L-shaped members having lower foot portions to be engaged by the cassette and leg portions moveable from an outer guiding position to a final position flush with the vertical wall surface. The upper edge of the wall is provided with a downwardly facing lip to engage the top of the cassette after insertion. The cassette wall opposite the vertical wall is inclined outwardly and upwardly from the vertical wall and is provided with an elongated laterally acting spring which moves the upper portion against the vertical wall and under the lip as the cassette is depressed downwardly to its loaded position. The lateral biasing spring may serve also as a light seal.

The floor of the cassette wall supports an aperture block assembly operable in the exposure/projection aperture in the cassette well to locate and feed the film strip during projection and also to guide the cassette into a precise loaded position. Cassette ejection is effected by a member operated to engage the cassette through a power switch and in a direction to move the upper portion of the cassette out from under the lip to enable it to be ejected automatically. Also, this organization facilitates automatic viewer operation to be initiated and terminated by cassette insertion and ejection.

Among the objects of the present invention are therefore, the provision of an improved cassette well structure for viewing apparatus of the type adapted to process and project cassette contained photographic film strips; the provision of such a cassette well structure which facilitates insertion and removal of a cassette from the viewing apparatus; the provision of such a structure by which the risk of film damage as a result of light leakage is minimized; the provision of a cassette well structure in which a power switch is arranged in connection with a cassette ejection mechanism to provide very reliable operation and the provision of a cassette well structure of the type mentioned in which the film cassette is very positively positioned for operation in a manner to insure precise registration of cassette contained parts with viewer components.

Other objects of the invention will be apparent from the detailed description to follow taken in conjunction with the accompanying drawings in which like parts are designated by like reference numerals.

DETAILED DESCRIPTION OF THE PREFERRED EMBODIMENT

For a general description of the viewing apparatus and film cassette with which the cassette well structure of the present invention is primarily intended for use, reference is made to FIG. 1-4 of the drawings in which the viewer and cassette are respectively designated generally by the reference numerals 10 and 12.

Figure 1:
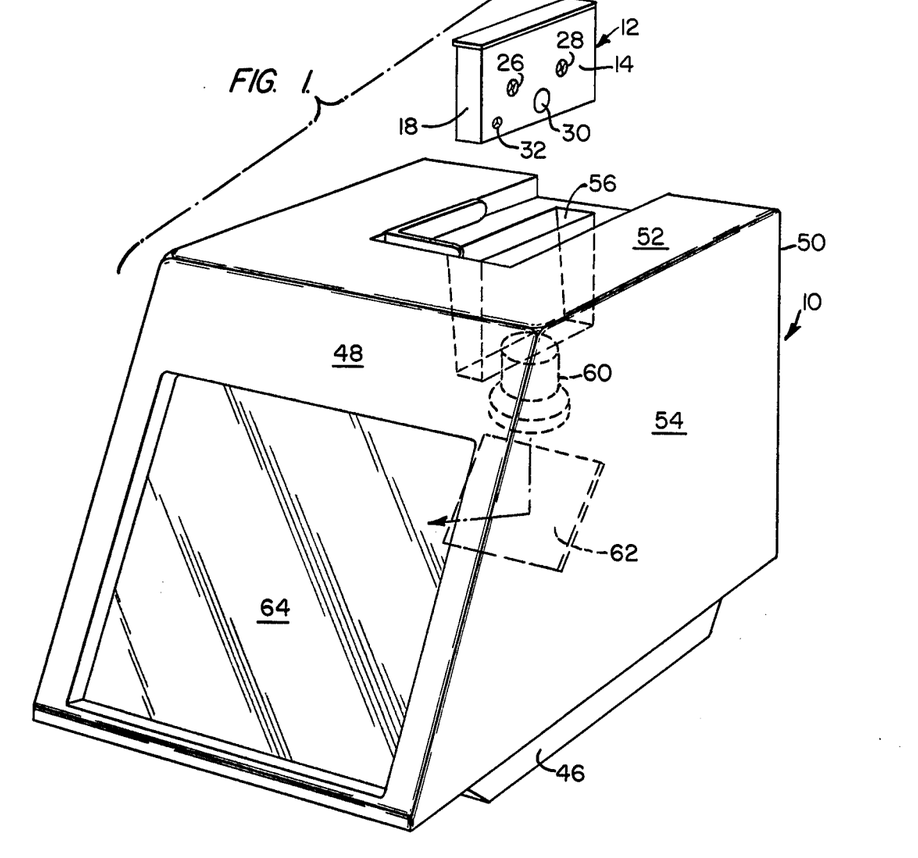
FIG. 1 is an exploded perspective view illustrating a multi-purpose photographic film strip cassette and viewer adapted to process and project images developed on the cassette contained film strip.
Figure 2:
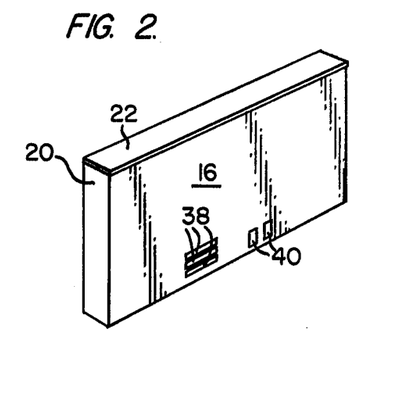
FIG. 2 is a perspective view illustrating the reverse side of the cassette exterior.
Figure 3:
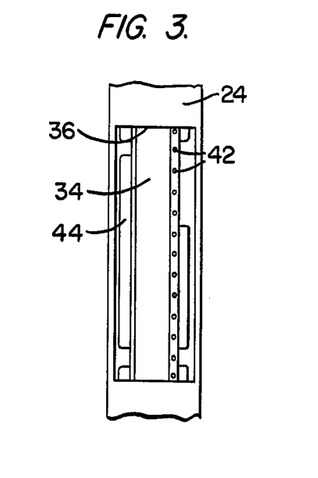
FIG. 3 is a fragmentary perspective view illustrating a segment of film strip contained in the cassette.

Although the cassette 12, in itself, is not novel with the present invention, a brief description of components accessible from the exterior thereof will facilitate a clearer understanding of the operating components of the viewer 10 and the cassette well components to be described in detail below. As shown in FIGS. 1-3 of the drawings, the cassette includes an exterior casing of generally parallelepiped configuration established by opaque planar side walls 14 and 16, end walls 18 and 20 and elongated top and bottom edge walls 22 and 24, respectively. The housing thus constituted contains a pair of film spools which, though not shown as such in the drawings, are in practice each provided with a drive coupling hub or sprocket 27 and 28 recessed in the wall 14 for engagement by viewer carried drive heads to be described below. In addition, and as shown in FIG. 1, the wall 14 of the cassette is apertured to expose a reflecting prism 30 as well as a slotted snubbing roller hub 32. The reflecting prism 30 functions to allow light for projection to be directed through the side wall 14 then reflected downwardly through a film strip 34 as it passes an opening 36 in the bottom wall 24 of the cassette as shown in FIG. 3. The slotted hub 32 is integrally formed with a cassette contained snubbing roller which is adapted for either free rotation or to be fixed as a film snubber when engaged by a viewer mounted component to be described below.

On the opposite side wall 16 shown most clearly in FIG. 2 of the drawings, the cassette is provided with air vent openings 38 positioned immediately behind the prism 30 and with a pair of electrical contacts 40. The contacts 40 are arranged with cassette contained components such that when the film strip 34 has been processed, the contacts will be disconnected electrically from each other whereas an unprocessed cassette, the contacts 40 will be in circuit continuity with each other. The contacts 40 thus provide an electrical signal for the viewer 10 by which the processed or unprocessed condition of the cassette may be electrically detected.

As shown in FIG. 3, the film strip 34 is provided with feed apertures 42 spaced evenly along one marginal edge thereof and is passed under a pressure plate 44 contained in the cassette 12. The presssure plate is spring biased against the film strip and functions to assure retention of the film strip in planar orientation during projection. It is depressible inwardly of the cassette to free the film strip of drag as during rewinding and processing modes of viewer operation. The cassette 12 and the components presented on the exterior thereof are fully disclosed in the above-indentified U.S. patents among others so that further description thereof is believed unnecessary to a full understanding of the present invention. As aforementioned, the cassette 12 is loaded with the film strip 34 together with a processor (not shown) by which the cassette may be placed in an appropriate camera for exposure of the film through the opening 36, removed from the camera and placed in the viewer 10 for processing and projection in accordance with automated programming means operated essentially under control provided essentially by the presence of the cassette and the conductive or non-conductive state of the contacts 40.

Figure 4:
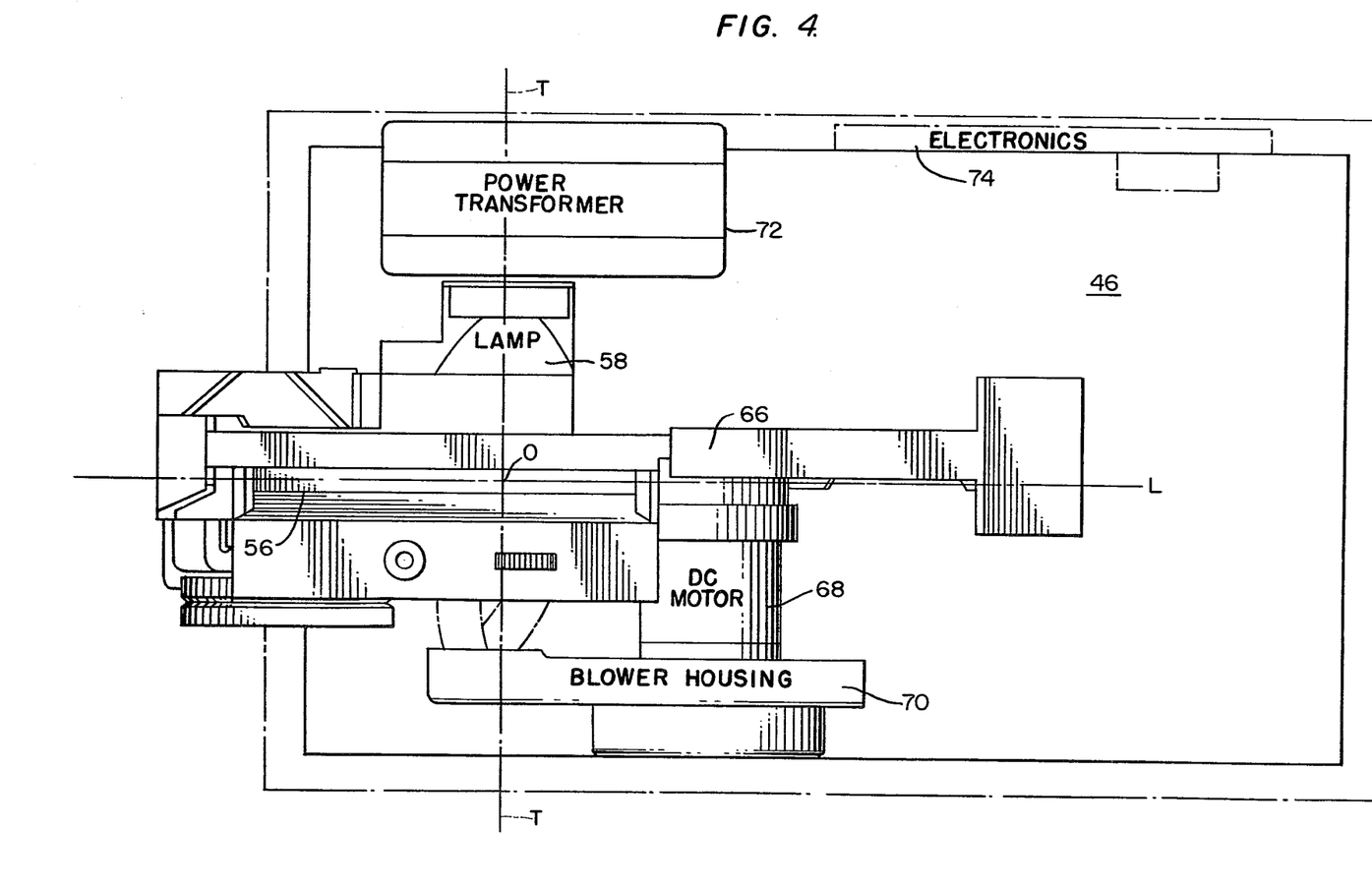
FIG. 4 is a plan view of internal viewer structure.
Figure 5:
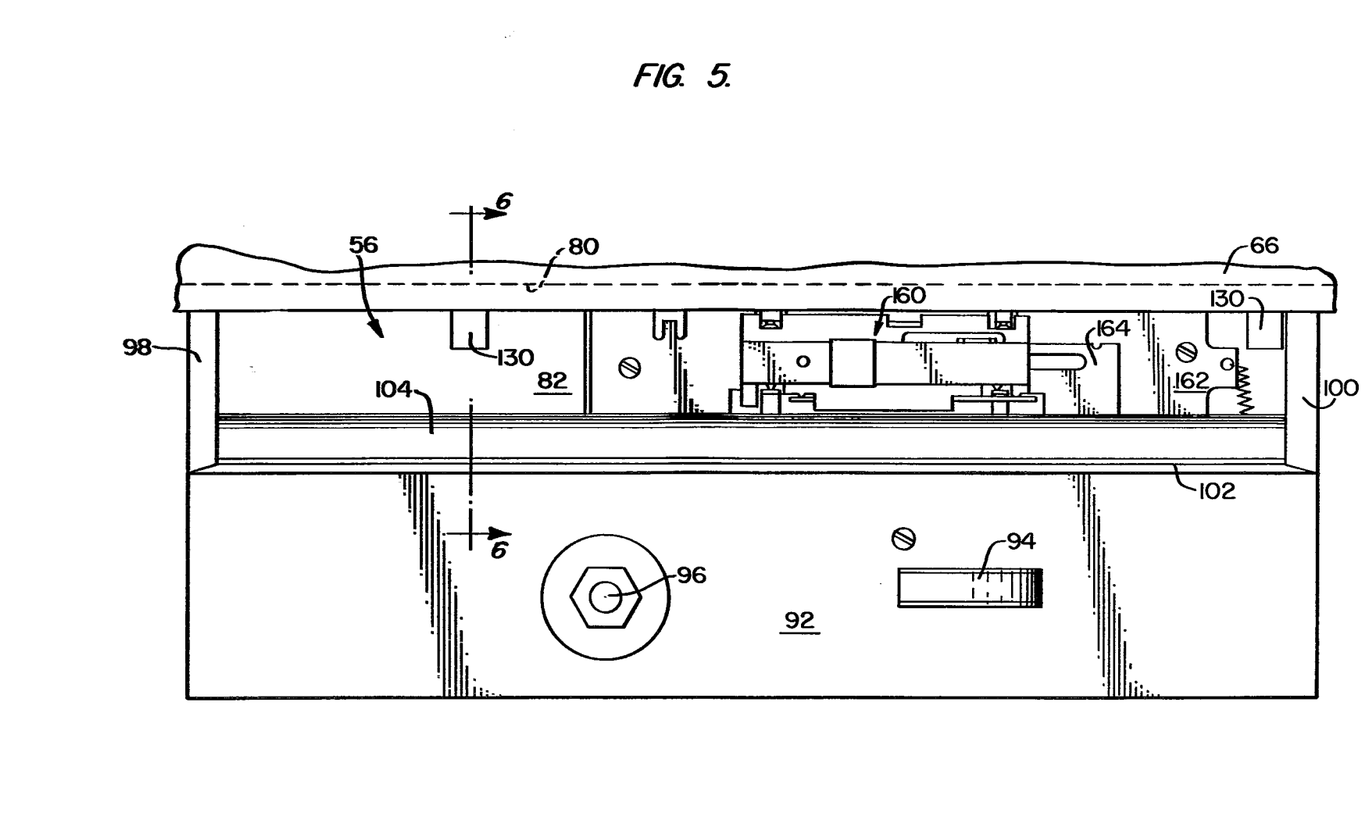
FIG. 5 is an enlarged fragmentary plan view illustrating the general organization of the cassette well of the invention.

The general structural organization of the viewer 10 is shown in FIGS. 1 and 4 of the drawings to include a chassis having a base 46 and supporting an enclosure defined by front and rear walls 48 and 50, a top wall 52 and side walls 54. Presented in the top wall 52 is a cassette receiving well 56 to which the present invention is principally directed. Reception of the cassette 12 in the well 56 enables projection of light eminating in a projection lamp 58 through the prism 30, downwardly through a lens 60 and forwardly from a reflecting mirror 62 to a rear projection translucent screen 64 presented on the front exterior wall 48 of the viewer 10.

The chassis including the base 46 is further constituted by a vertically oriented central support casting 66 shown in FIG. 4. Other components supported either on the base 46 or from the casting 66 on the viewer interior include a drive motor 68, a blower housing 70, a power transformer 72 and an electronics module 74.

While the structure of the well 56 and related components will be described in detail below, it will be noted with reference to FIG. 4 that an optical center O of the viewer is established by the intersection of a longitudinal center plane L and a transverse vertical plane T together with a horizontal reference plane, which though not designated in FIG. 4, is mutually perpendicular to the planes L and T and includes the axis of the projection lamp 58. Orientation of the optical axis O with other structure of the viewer well 56 will be apparent from the description to follow.

Figures 6, 9, 10:
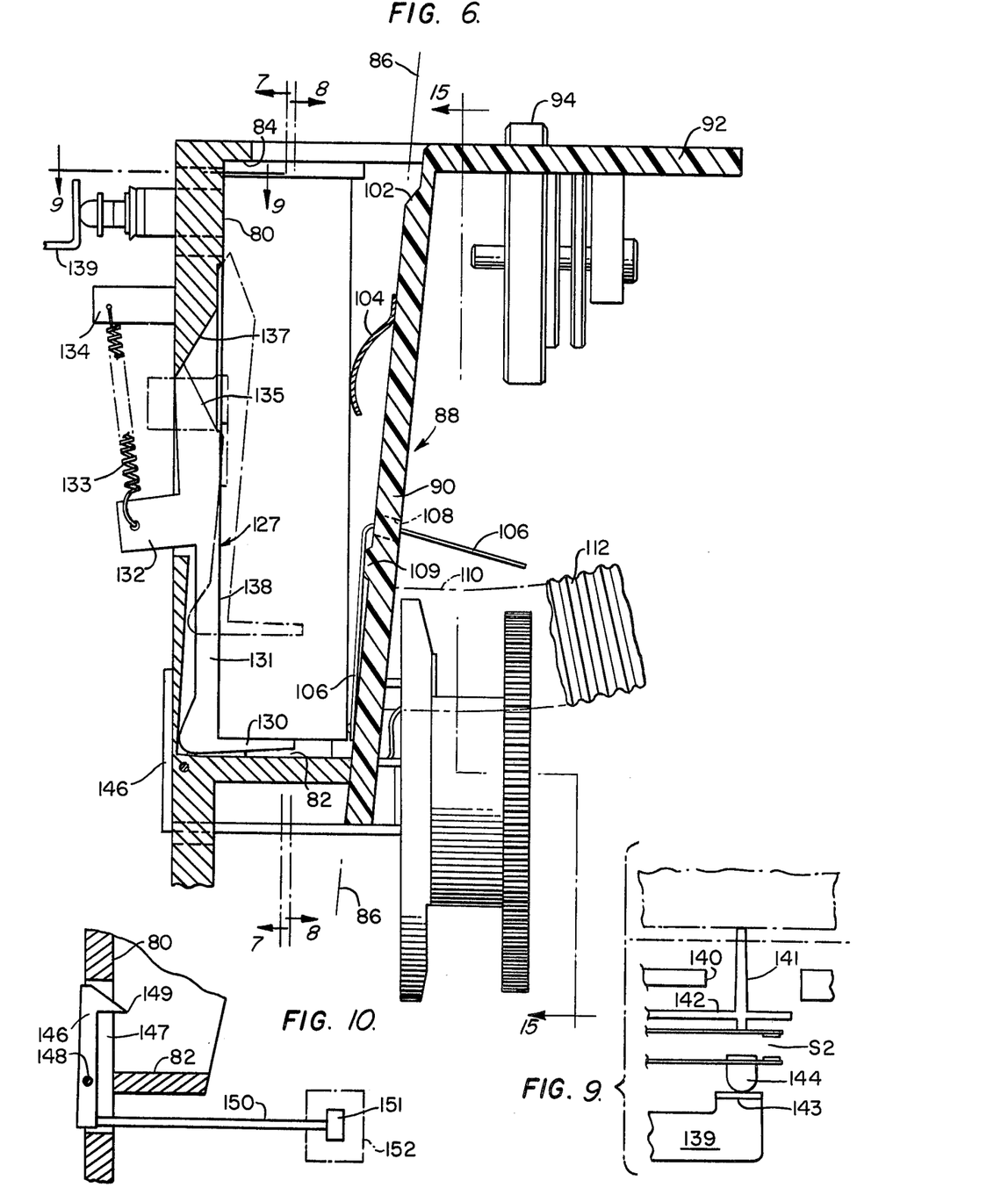
FIG. 6 is an enlarged cross-section on line 6—6 of FIG. 5.
FIG. 9 is an enlarged fragmentary cross-section taken on line 9—9 of FIG. 6.
FIG. 10 is an enlarged fragmentary cross-section taken on line 10—10 of FIG. 7.

An understanding of the structure establishing the cassette well 56 as well as the general organization of components positioned within the well may be gained by reference to FIGS. 5-8 of the drawings. It will be noted particularly with reference to FIGS. 6 and 7 that the casting 66 is provided with projecting flange-like formations 76 and 78 to define the rear, bottom and forward peripheral wall portions of the cassette well 56. A machined, generally planar wall 80 lies within these peripheral wall portions to establish an interior vertical surface along the one side of the well 56 parallel to the vertical longitudinal plane L described above. The interior surface of the wall 80 extends from a cassette floor 82 defined in part by the flange portions 76 and 78, upwardly to a top edge delineated by the underside of a transverse lip 84 extending the length of the well 56. Also as seen in FIG. 6, the distal edges of the flange formations 76 and 78 lie in an inclined plane 86 and provide a bearing surface for a cassette well cover plate 88. The plate 88 is more specifically characterized as being formed of plastic material so as to be electrically non-conductive. Also the plate 88 is of inverted L-shaped configuration in transverse section to establish an upright wall portion 90, secured in abutting engagement with the flange formations 76 and 78, and joining at its upper edge in an integral horizontal flange portion 92. The flange 92 supports a focusing knob 94 so that it is presented at the top of the viewer 10 as well as a push buttom replay switch 96.

It will be observed by reference to FIGS. 5–8 that the mouth of the well 56, as defined by the flange formations 76 and 78 at the ends and by the flanged cover plate 88 on the inclined side of the well, is provided with outwardly flared or chamfered internal surfaces 98, 100 and 102 to facilitate initial inserting movement of the cassette 12 into the well 56. Also as seen in these figures, the interior of the inclined wall 90 of the flanged cover plate 88 supports an outwardly and downwardly extending cassette loading spring and binder 104 which extends longitudinally for the length of the well 56. In addition, a pair of conductive terminal strips 106 extend downwardly from the apertures 108 over bumps 109, to which they are secured, in a position to be engaged and flexed against the cassette contacts 40 described above with reference to FIG. 2. The terminal strips extend outwardly through the apertures 108 as shown in FIG. 6 to facilitate their connection electrically to the electronics module 74.

Figure 8:
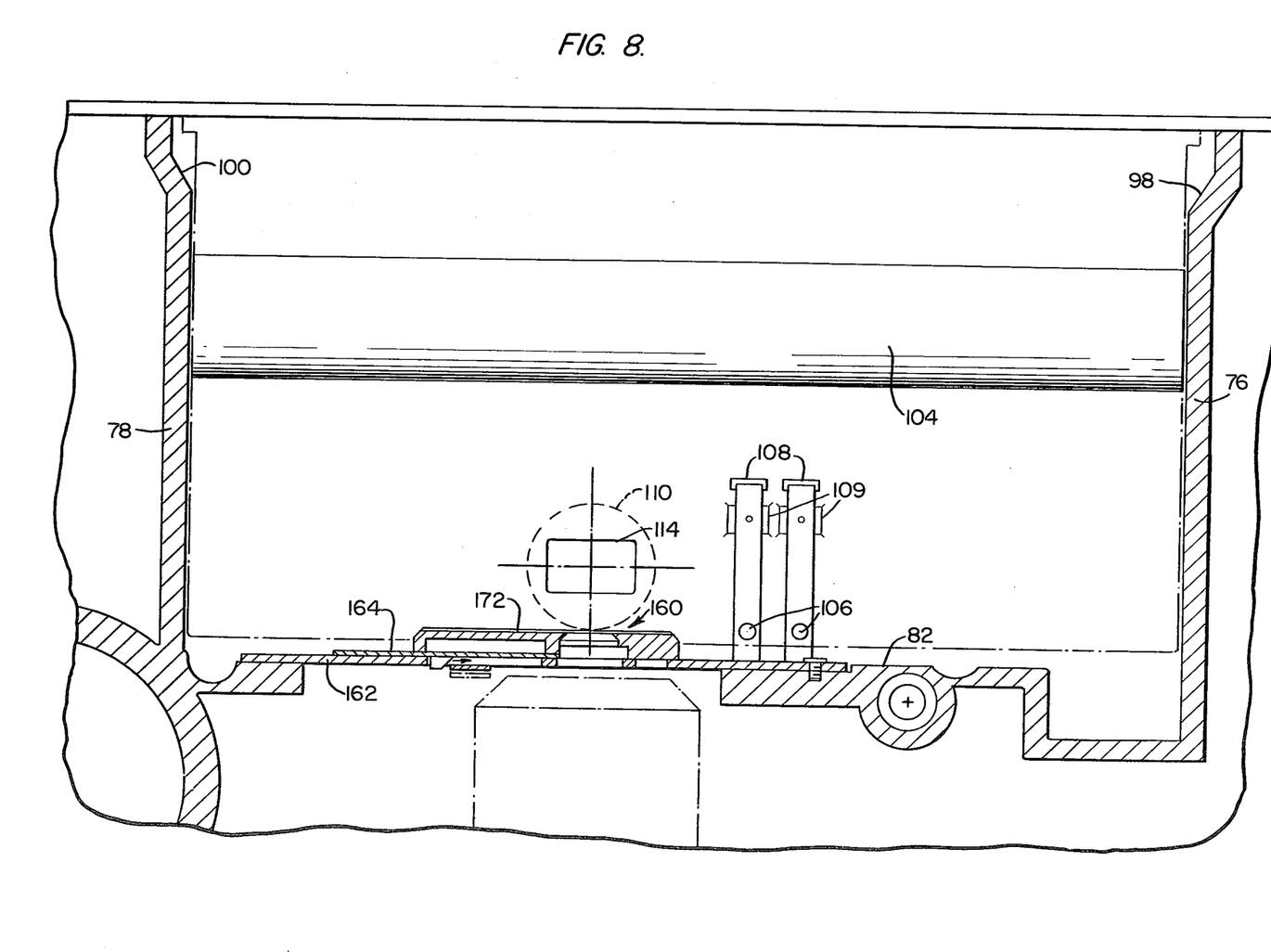
FIG. 8 is a fragmentary cross-section on line 8—8 of FIG. 6.

An air conduit coupling 110 extends outwardly of the wall 90 to facilitate the connection of an air hose 112 from the blower housing 70. As shown in FIG. 8, the coupling 110 opens to the cassette interior through a generally rectangular opening 114 centered on the optical axis O to be aligned with the air vent holes 38 in the cassette 12. As above mentioned, the air vent holes 38 are disposed directly behind the reflecting prism 30.

Figure 7:
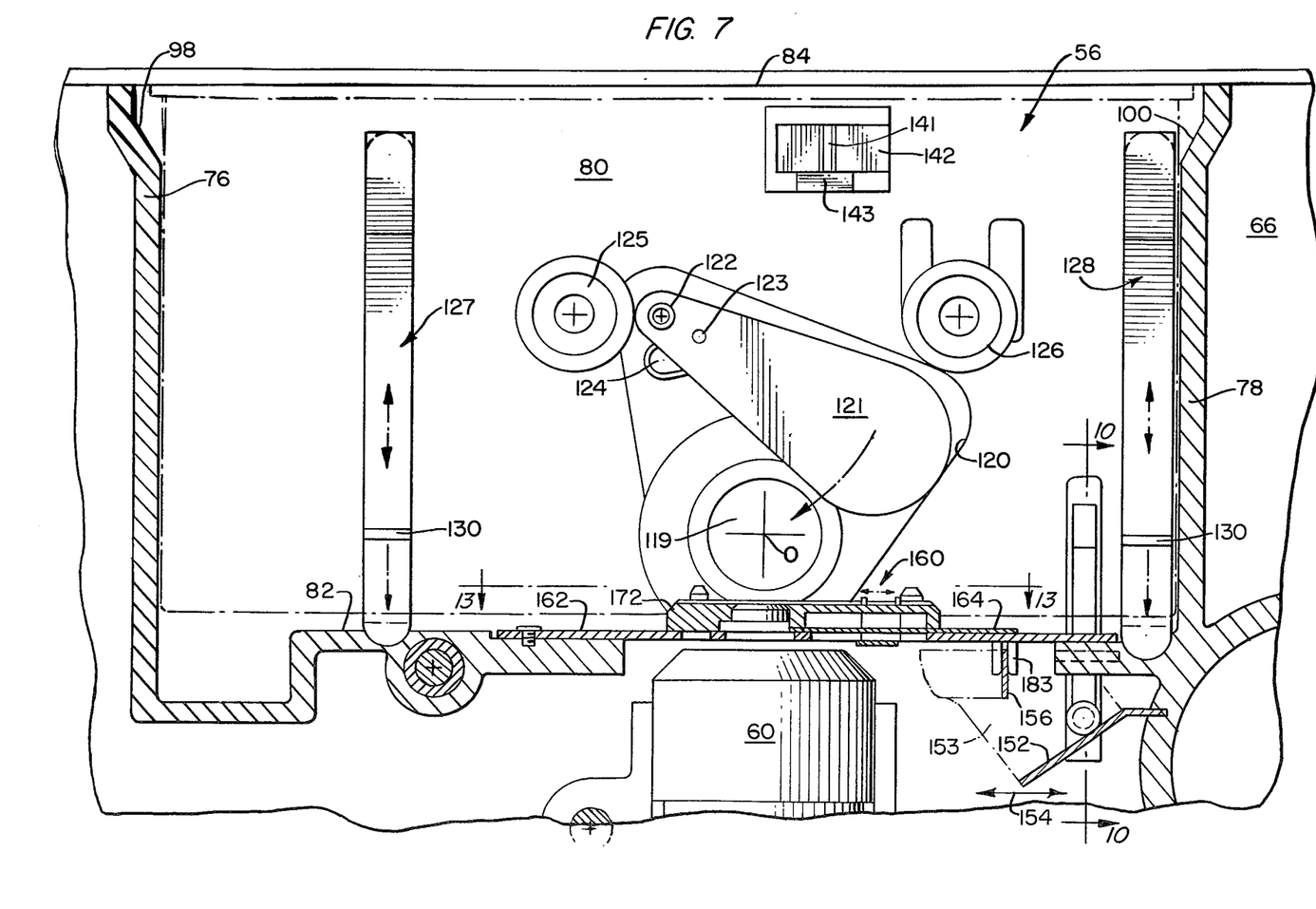
FIG. 7 is a fragmentary cross-section on line 7—7 of FIG. 6.

Cassette well components presented from the vertical wall surface 80 are illustrated most clearly in FIGS. 6, 7, 8 and 10 of the drawings. As shown in FIG. 7, a circular projection light aperture 119 is provided in the wall 80 of the casting 66 to be concentric with the optical axis O and thus aligned with the projection lamp 58 as well as with the reflecting prism 30 presented on the side wall 14 of the cassette 12 when the latter is positioned in the well 56. It will be noted that the circular aperture 119 opens to the cassette interior in the bottom of a generally triangular recess 120 machined in the wall surface 80. The recess 120 accommodates a blade-like blinder 121 pivoted on an axis 122 for movement from the open position depicted in FIG. 7 to a position overlying the circular aperture 119 in a manner to prevent entrance of light through the aperture to the cassette well interior. Pivotal movement of the blinder 121 in this manner is effected by a pin 123 extending through an arcuate aperture 124 in the wall 80 and into engagement with a shift plate assembly (not shown), movable between two positions corresponding to the respective pivotal positions of the blinder 121. The blockage of light passing through the aperture 119 and the reflecting prism 30 in the cassette is important to prevent exposure of the film strip 34 to unwanted light during processing.

A pair of spool drive heads 125 and 126 are journalled for rotation in the wall 80 on axes to be aligned with the respective take-up and supply spool drive sprockets 26 and 28. The drive heads 125 and 126 are designed for one way engagement with drive sprockets 26 and 28 presented through the wall 14 of the cassette 12 and as shown in FIG. 6, project inwardly of the wall surface 80 so as to extend at least partially through the cassette wall 14. While the projection of the drive heads into the well 56 in this manner is needed to insure driving engagement thereof with the cassette contained film spools, it will be appreciated that because of this inward projection, the drive heads 125 and 126 present an obstruction to vertical sliding movement of the cassette along the wall surface 80.

To facilitate guiding the cassette 12 past the drive heads 125 and 126 and also to assist in ejecting the cassette 12 from the well 56, a pair of L-shaped members 127 and 128 are yieldably supported in the wall 80 at locations spaced along the length of the cassette well 56 for movement between a first position depicted by phantom lines in FIG. 6 and in which the cassette well 56 is empty, and a second position depicted by solid lines in FIG. 6 in which the cassette 12 is loaded into the wall 56. Each of the L-shaped members 127 and 128 is similarly shaped to establish a cassette bearing foot 130 and a generally vertical leg portion 131 having a bracket formation 132 for engagement by one end of a tension spring 133, the other end of which is engaged with a similar bracket 134 or other means suitably fixed to the casting 66. The leg portion 131 is provided with an upwardly inclined or chamfered end surface 135 and is received within a shaped slot 136 in the wall 80. In particular, it will be noted that the slot 136 is provided with a downwardly inclined ramp surface 137 opening through the casting 66 in a manner such that the linear edge 138, presented to the well interior, moves to a position essentially flush with the inner wall surface 80 when the cassette 12 is loaded into the well. The surface 138 is inclined to approximate parallelism with the inner surface of the cover plate wall 90 in its intial or first position.

In light of the organization of the L-shaped members 127 and 128, together with the location of the spring 104 on the cover plate wall 90, it will be seen that cassette insertion and retention within the well 56 is effected simply by inserting the bottom wall 24 of the cassette into the mouth of the well. Subsequent downward pressure on the top wall of the cassette will result in elongation of the springs 133 with downward and outward movement of the L-shaped members 127 and 128. Simultaneously, the spring 104 will operate to urge the upper portion of the cassette 12 toward the wall surface 80 such that the top wall of the cassette underlies the lip 84. The bias of the springs 133 acting on the cassette through the foot portions 130 of the L-shaped members 127 and 128 together with the bias of the spring 104 will retain the cassette firmly in this loaded position.

Ejection of the cassette 12 from the well 56 in accordance with the present invention, is effected by a cassette eject bar 139. Although the complete structure and operation of the eject bar 139 will become apparent from the description to follow, the interaction of the cassette 12 and the eject bar 139 may be understood by reference to FIGS. 6 and 9 of the drawings. As shown in these figures, the wall 80 is provided with an aperture window 140 near the upper portion thereof under the lip 84. A push rod or leg 141 formed integrally on a resilient plastic leaf 142 extends through the window 140 to engage the side of the cassette 12. A power switch S-2 in positioned between the plastic leaf 142 and a flange or tab 143 at the end of the eject bar 139. A switch buttom 144 is positioned such that movement of the flange tab 143 on the eject bar toward the cassette 12 will advance the leg 141 into the cassette to move it out from under the lip 84. Similarly, insertion of the cassette will engage the leg 141 to close the switch S-2 against the tab 143 on the eject bar 139. In light of this organization, it will be appreciated that movement of the tab 143 to advance the cassette laterally out from under the lip 84 will cause the L-shaped members 127 and 128 to move upwardly and eject the cassette 12 from the well. Also, it will be apparent that the switch S-2 will be either opened or closed depending on the absence or presence of the cassette 12 in the well 56.

Figure 13:
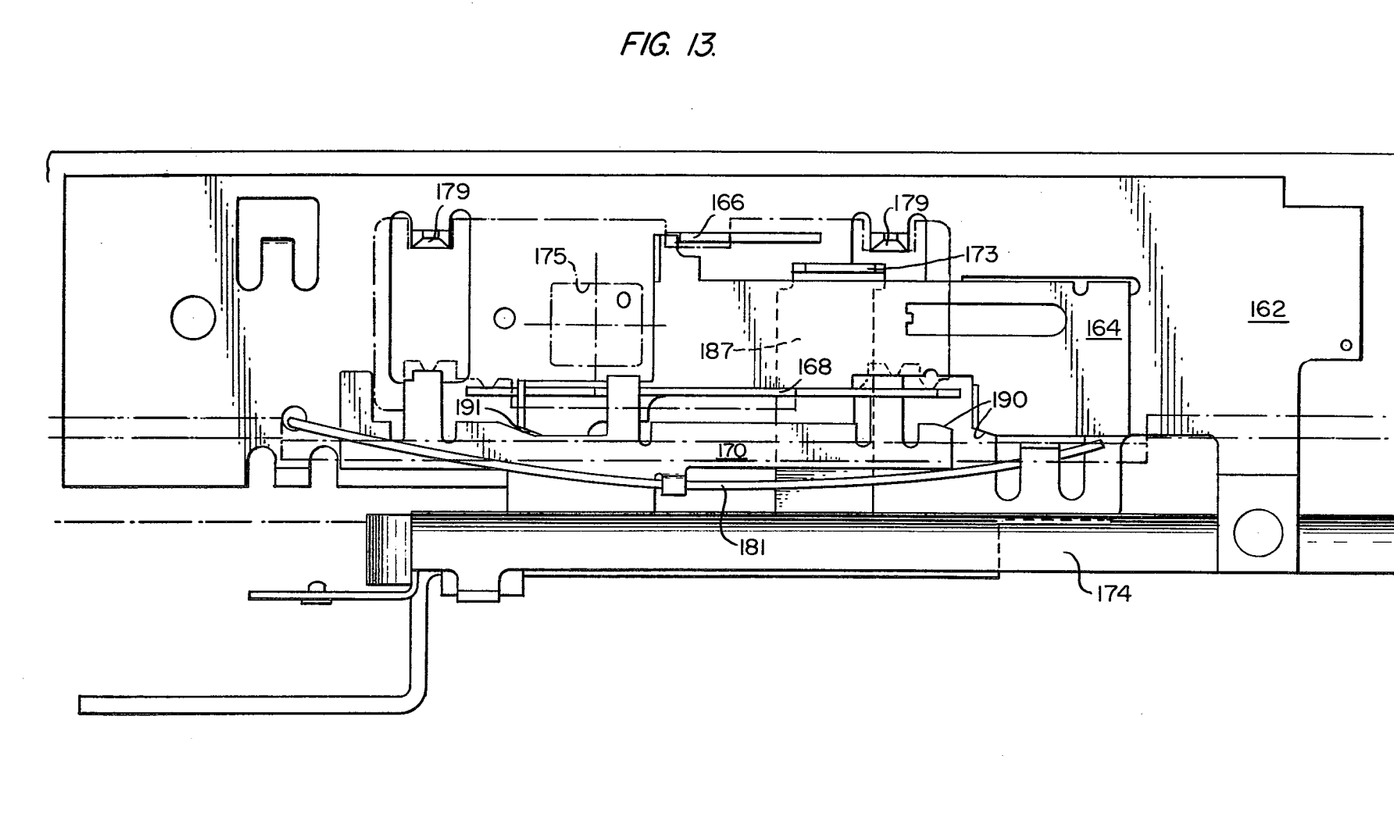
FIG. 13 is an enlarged plan view illustrating a portion of the cassette well floor of the invention as seen on line 13—13 of FIG. 7.

As mentioned above, a snubbing roller in the cassette 12 is intended to operate either as a freely rotatable guide roller during film processing or rewind, or as a fixed snubbing post to facilitate passage of the film strip to the take-up spool during incremental advance of a run in the film strip past the opening 36 in the bottom wall 24 of the cassette. Also, the slotted hub 32 of the snubbing roller is presented through the cassette wall 14 so that it will be placed against the wall surface 80 upon cassette insertion into the well 56. Control over snubbing roll rotation is effected by a snubber pawl 146 as shown in FIGS. 6, 7 and 10 of the drawings. The pawl 146 is disposed in an opening 147 near the bottom of the wall 80 and pivotally supported on a pintle 148. A snubbing roller hub engagement tang 149 projects inwardly through the aperture 147 whereas an actuating rod 150 projects from the lower end of the pawl 146 outwardly past the cassette well 56 to a roller 151 at its outer end. The roller 151 is positioned to overlie a ramp 152 formed as a part of a horizontally movable link 153, part of which is shown by phantom lines in FIG. 7. Although the complete link is not shown in the drawings, it will suffice for a complete understanding of the present invention to note that movement thereof in the direction of the arrow 154 will cause raising and lowering of the roller 151. Also, the link supports a clip 156 to be described below. Also it will be understood from this limited description that the movement of the link 153 will pivot the snubbing pawl in the manner to either prevent rotation of the cassette contained snubbing roller or retain it against rotation As shown in FIGS. 5, 7, 8, 13 and 14 of the drawings, an aperture block assembly, generally designated by the reference numeral 160, is positioned on the floor 82 of the cassette well 56. Individual components of this assembly are shown most clearly in FIG. 14 to include a foundation plate 162, a blinder plate 164, left and right pressure plate lifters 166 and 168, respectively, a movable side guide 170 and an aperture block 172. These components, in conjunction with a feed claw 173 integral with a feed shuttle 174 (FIGS. 13 and 15) to be described, are oriented in the well 56 to extend through and operate within the opening 36 in the bottom wall of the cassette 12. Thus, the aperture block defines a framing window 175 located in a longitudinal groove 176 to delineate elevated film strip tracks 177 and is peripherally dimensioned under chamfered edges 178 to fit closely within the cassette opening 66 and thus locate the cassette well 56 precisely with respect to the optical center O, particularly in a longitudinal frame of reference. Also, the tracks 177 cooperate with the pressure plate 44 in the cassette 12 to retain the film strip 34 in a vertically fixed planar orientation as it passes the window 175. Lateral positioning of the film strip as it passes the window 175 is effected by fixed guide pins 179 struck out out of the foundation plate 162 and extending upwardly beyond the level of the tracks 177 to guidingly engage one edge of the film strip 34. The opposite edge of the film strip is engaged by a pair of similarly shaped guide pins 180 upstanding from the side guide 170. The side guide is slidably mounted on the foundation plate 162 and biased toward the fixed guide pins 179 by a wireform spring 181 as shown in FIG. 13.

While the retention of the film strip against the tracks 177 on the aperture block by the pressure plate 44 in the cassette is desirable during the projection for viewing of successive frame images carried on the film strip, the drag forces exerted on the film strip during film processing and/or rewind are objectionable and moreover, the retention of the film strip precisely in a fixed orientation with respect to the framing window 175 is not necessary during these operational modes. To this end, the left and right plate lifters 166 and 168 are positioned for vertical movement within the aperture block 172 and are movable from a depressed or retracted position upwardly into engagement with the cassette contained, downwardly biased pressure plate 44 to space the pressure plate from the film and the tracks 177. Upward movement of the lifters 166 and 168 is effected by camming surfaces 182 provided on the blinder plate 164 which is shiftable longitudinally with respect to the foundation plate 162 and aperture block 172, the latter being fixed to each other and to the cassette well floor 82. Such longitudinal shifting of the blinder plate is accomplished by the clip 156 carried by the link 153 described above (see FIG. 7) with a depending bifurcated lug 183 on the blinder plate 164 and which extends through an elongated slot aperture 184 to be presented under the well 56 as may be seen in FIG. 7, for example.

The blinder plate 164 also carries a depending cam tab 185 which extends through an opening 186 in the foundation plate 162 to engage an arm 187 extending between film feeding claw 173 and the shuttle 174. Thus, it will be appreciated that simultaneously with elevation of the pressure plate lifters 166 and 168, the claw 173 will be depressed by the camming tab 185 (FIG. 8) on the blinder plate 164 to a position out of engagement with the film strip 34, such as during rewind and/or processing operations. The blinder plate is further formed with an opaque plate or body portion 188 positioned adjacent a cut-out 189 and normally positioned forwardly and clear of the framing window 175 in the position illustrated in FIG. 13 of the drawings. Rearward movement of the blinder plate by the link 153, however, moves the plate portion under the window 175 to prevent upward passage of light to the film strip 34, again principally during processing thereof.

Figure 14:
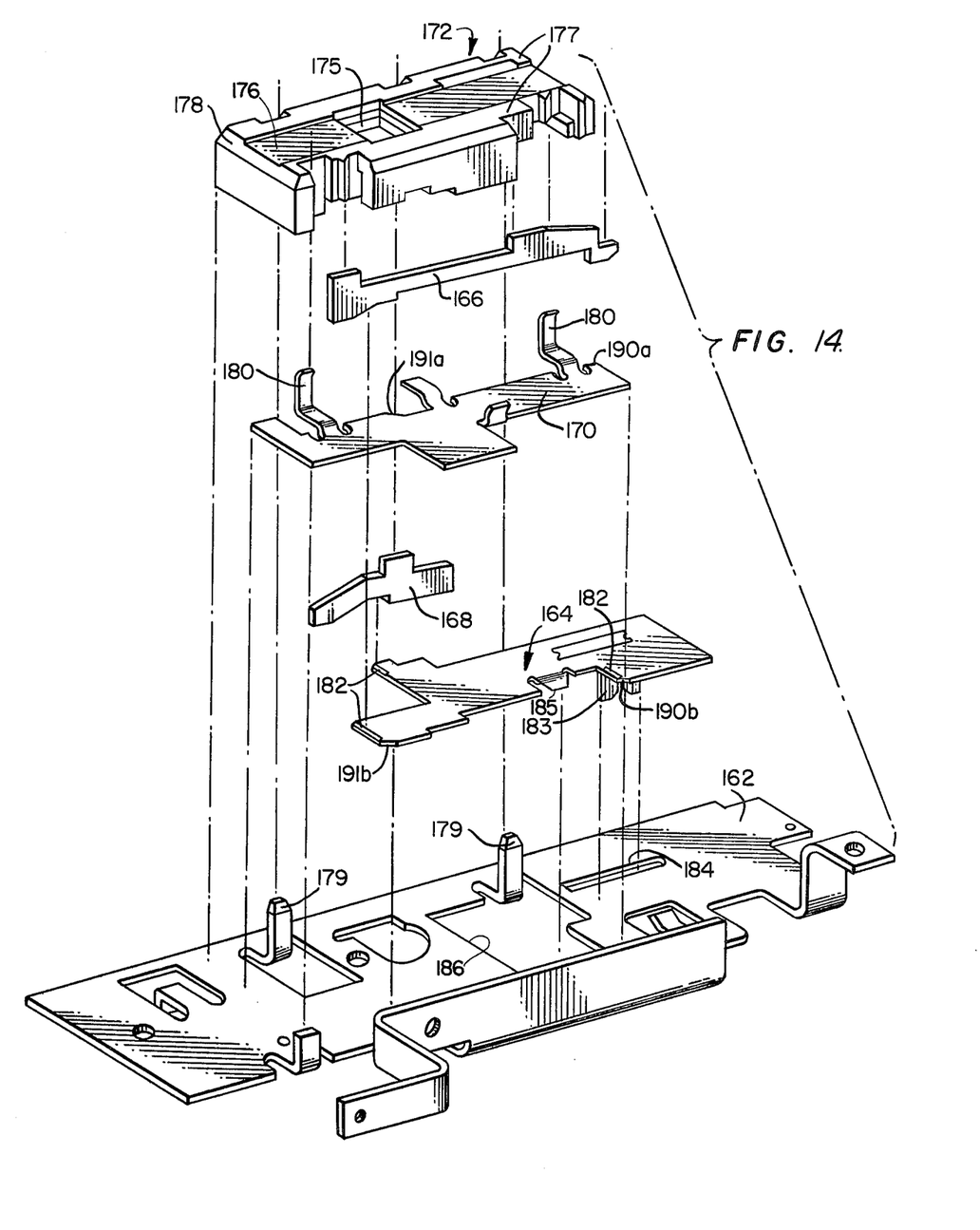
FIG. 14 is an exploded perspective view of components shown in FIG. 13.
Figure 15:
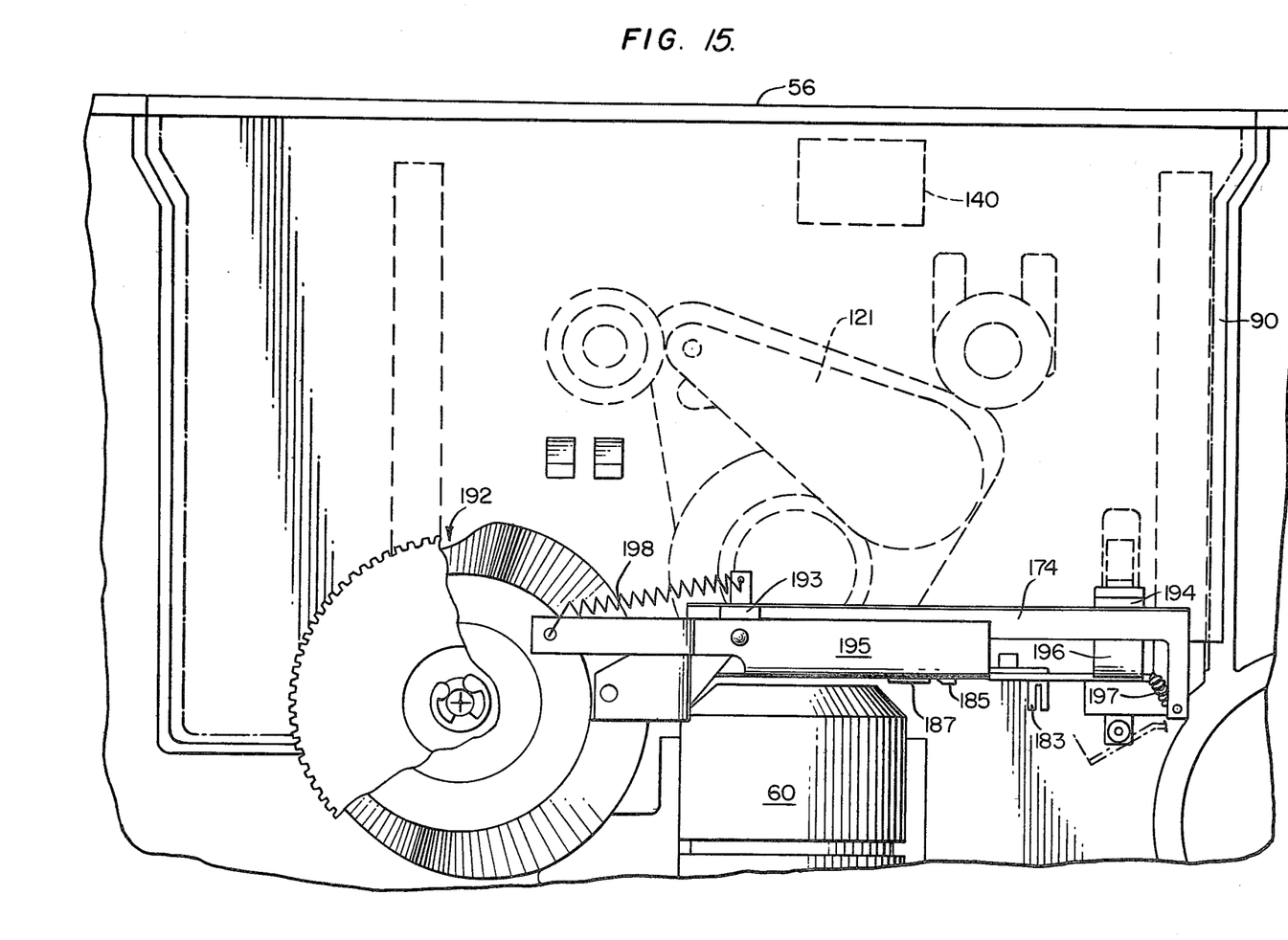
FIG. 15 is an enlarged fragmentary side elevation of the cassette well of the invention as seen on line 15—15 of FIG. 6.

As shown most clearly in FIGS. 13 and 14, the movable side guide 170 and the blinder plate 164 are provided with cooperating front and rear camming ramp pairs 190 and 191. These camming ramps are vertically oriented so that rearward movement of the blinder plate 164 in the manner described will additionally move the side guide 170 outwardly against the bias of the wireform spring 181.

The film feeding shuttle 174 is an integral stamping with the claw 173 and arm 187. The shuttle is an elongated member of arcuate transverse section and adapted to be driven by a rotatable cam 192 in a manner such that the claw 173 undergoes reciprocable back and forth motion simultaneously with rotatable up and down motion to engage and disengage the feed apertures 42 and the film strip 34. Although a detailed description of the film feed shuttle 174 is not necessary for a complete understanding of the present invention, it will be noted by reference to FIGS. 13 and 15 that the shuttel 74 is supported along the exterior of the cover plate wall 90. Support for the feed shuttle 174 is provided by inner and outer bearing blocks 193 and 194 mounted on a vertical flange 195 and a bracket formation 196 formed respectively on the foundation plate 162. The shuttle body 174 is retained against the bearing blocks by front and rear springs 197 and 198 in a manner to achieve the appropriate movement of the claw 173 and also in a manner to permit the depression of the claw 173 and arm 187 by the depending cam tab 185 on the blinder plate 164 in the manner above-described.

Figure 11:
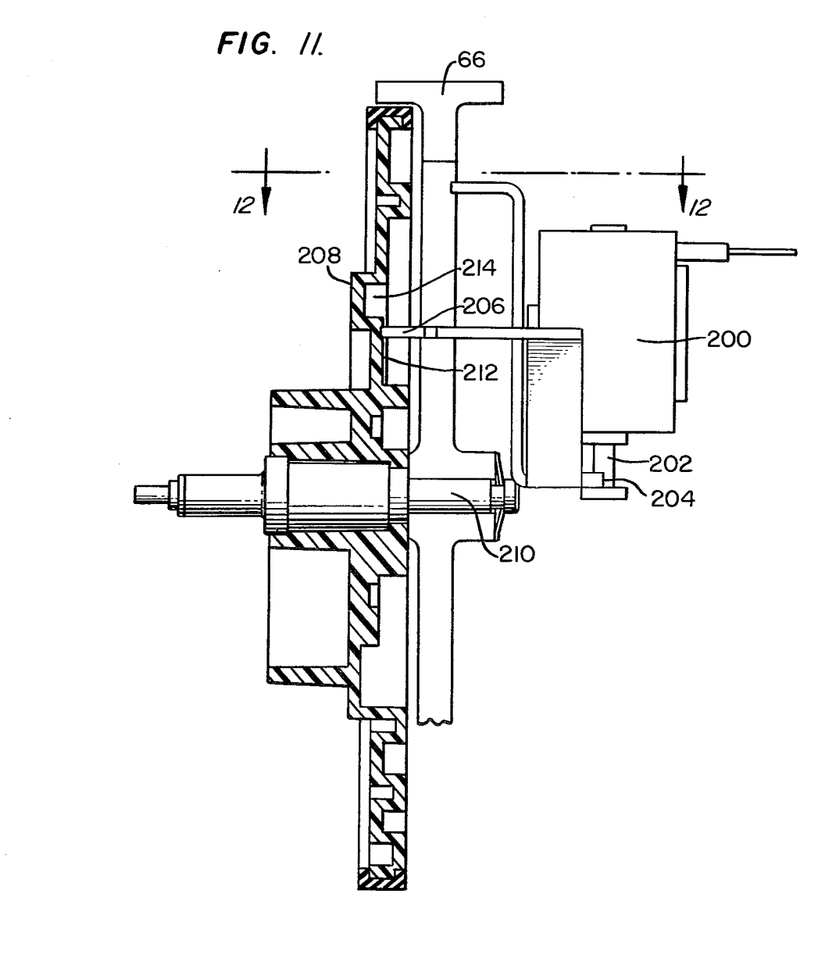
FIG. 11 is an end view in partial cross-section illustrating a cassette ejecting organization associated with the cassette well of the invention.
Figure 12:
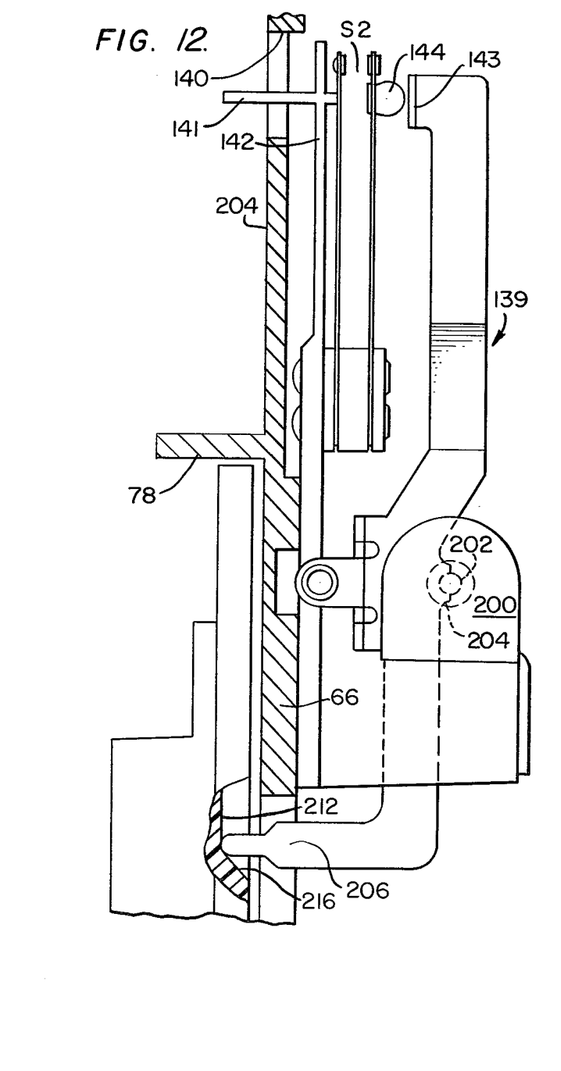
FIG. 12 is a cross-section taken on line 12—12 of FIG. 11.

As described above, the eject bar 139 operates through the power switch S-2 and the leaf spring supported push rod 141 to advance the upper portion of the cassette 12 outwardly from under the transverse lip 84 so that the cassette will be ejected from the wall 56. A more complete understanding of the construction of the eject bar 139 may be had by reference to FIGS. 11 and 12 of the drawings. As shown, the eject bar 139 extends rearwardly from the end on which the tab 143 is mounted under a lifting solenoid 200 having a plunger 202 to pivotally engage the bar at a fulcrum point 204. The bar then extends upwardly and rearwardly to an inturned cam follower lug 206 in engagement with a programming cam disc 208. The programming cam disc is supported for rotary movement on an axle 210 carried by the casting 66 forwardly in the viewer of the cassette well 56. The programming cam 208 is adapted to be indexed by means (not shown) to control the operation of the viewer 10 in an "off" "process/rewind" and "project" modes of operation. Although the programming disc 208 carries a plurality of individual cam tracks, it wll be noted in FIG. 11 that the follower lug 206 on the eject bar engages a cam track 212 radially adjacent to and inwardly of an annular recess 214, the track 212 having a ramp 216 operable to pivot the eject bar 139 about the plunger 202 of the solenoid 200 in a direction to cause the cassette ejection movement described above. In addition, energization of the solenoid 200 such that the lub 206 is lifted to ride in the track 214 will prevent cassette ejection by the ramp 216. Because of this organization, operation of the eject bar, being the combined function of the solenoid 200 and the logic disc 208 will enable indexing rotation of the cam disc independently of a cassette eject operation.

In light of the construction of the cassette well 56 and organization of components therein adapted to cooperate with the cassette 12 it will be seen that while the well facilitates cassette insertion, it also positions and orients the cassette precisely with respect to operating components supported by the casting 66. The precise registration of the cassette with viewer mounted components is provided in substantial measure by the formation of the wall 90 and the lip 84 against which the cassette is biased by a combination of the springs 133 through the L-shaped members 127 and 128 and the cassette loading spring 104. The latter spring additionally functions to prevent light leakage through the space between the vertical wall 90 of the cover plate and the lower portion of the cassette wall 16 in which the air vent openings 38 are located. The additional light seals provided by the blinder 121 and the blinder plate 164 prevent leakage of light through the prism 30 and the framing window 175, a feature important to processing of the film strip 34.

It will be appreciated therefore, that the present invention provides an improved cassette well construction for motion picture viewing apparatus of the type described and by which the above-mentioned objectives are completely fulfilled. It will be apparent to those skilled in the art from the preceding description that various changes in/or modifications may be made in the illustrated embodiment without departure from the inventive concepts manifested by the disclosed embodiment only, not limiting, and that the true spirit and scope of the present invention be determined by reference to the appended claims.

What is claimed is:

1. In apparatus for viewing by projection a photographic film strip contained within a substantially thin film cassette which has a pair of opposed major wall surfaces connected and spaced apart by a peripheral wall substantially defining the thickness of the cassette and having an opening thereinf for projection of transparent image frames contained on the film strip, the improvement comprising:

means for receiving the cassete and operatively positioning the cassette within said apparatus including means defining an elongated opening slightly wider than the thickness of the cassette through which the cassette can be slidably inserted into said apparatus, a wall surface extending inwardly of said apparatus from said opening substantially perpendicular to the plane of said opening, the end of said appartus wall surface adjacent said opening terminating at a position spaced laterally from said opening, an inwardly facing abutment surface adjacent said opening and extending away therefrom in the direction of said end of said apparatus wall surface, means extending from said wall surface for actuating components within the cassette, means for guiding the portion of the cassette first entering said opening over and past said cassette component actuating means, means on the opposite side of the cassette as it enters said apparatus from said apparatus wall surface for engaging one major surface of the cassette and resiliently urging the cassette towards said apparatus wall surface so that the other major wall surface of the cassette will untimately rest against said apparatus wall surface with said cassette component actuating means operably engaging components of the cassette, and means for automatically engaging said cassette as it is inserted through said opening to resiliently urge said cassette in a direction outwardly of said apparatus through said opening, said last stated means and said means for resiliently urging the cassette against said apparatus wall surface in combination serving to seat a portion of the cassette's peripheral wall against said abutment surface when the cassette has been fully inserted into said apparatus through said opening; and selectively operative means for exerting a force against the other major wall surface of the cassette to effect the displacement of the portion of the cassette seated against said abutment surface into alignment with said opening against the force exerted on the cassette by said means for resiliently urging the cassette against said apparatus wall surface, said means for urging the cassette outwardly of said apparatus through said opening being operative at such time to eject at least a portion of the cassette through said opening.

2. The improvement of claim 1 additionally including another apparatus wall surface facing said first mentioned apparatus wall surface extending inwardly of said apparatus from said opening at an angle so that portions thereof are progressively more closely spaced to said first-mentioned apparatus wall surface the further they are spaced from said opening.

3. The improvement of claim 2 wherein said means for resiliently urging the cassette towards said first-mentioned apparatus wall surface comprises a spring mounted from said other apparatus wall surface.

4. The improvement of claim 1 additionally including a power switch and wherein said selectively operative means includes a push rod slidably mounted for displacement from a first position wherein it extends through said apparatus wall surface and is operative to displace the portion of a cassette seated against said abutment surface into alignment with said opening and a second position wherein it does not so extend beyond said apparatus wall surface, said switch being arranged so as to be non-conductive when said push rod is disposed in its said first position and automatically closed responsive to said push rod being displaced from its said first position to its said second position, and further including means for resiliently biasing said push rod towards its said first position, the insertion of a cassette into its operative position within said apparatus thus automatically causing said switch to be closed and the subsequent displacement of said push rod into its said first position to initiate the ejection of the cassette through said opening automatically causing said switch to be rendered nonconductive.

5. In apparatus for performing selected operations with an elongated strip of material contained within a substantially thin cassette which has a pair of opposed major wall surfaces connected and spaced apart by a peripheral wall substantially defining the thickness of the cassette, the improvement comprising:

means for receiving the cassette and operatively positioning the cassette within said apparatus including means defining an elongated opening slightly wider than the thickness of the cassette through which the cassette can be slidably inserted into said apparatus, a wall surface extending inwardly of said apparatus from said opening substantially perpendicular to the plane of said opening, the end of said apparatus wall surface adjacent said opening terminating at a position spaced laterally rom said opening, an inwardly facing abutment surface adjacent said opening and extending away therefrom in the direction of said end of said apparatus wall surface, means extending from said wall surface for actuating components within the cassette, means for guiding the portion of the cassette first entering said opening over and past said cassette component actuating means, means on the opposite side of the cassette as it enters said apparatus from said apparatus wall surface for engaging one major surface of the cassette and resiliently urging the cassette towards said apparatus wall surface so that the other major wall surface of the cassette will ultimately rest against said apparatus wall surface with said cassette component actuating means operably engaging components of the cassette, and means for automatically engaging said cassette as it is inserted through said opening to resiliently urge said cassette in a direction outwardly of said apparatus through said opening, said last stated means and said means for resiliently urging the cassette against said apparatus wall surface in combination serving to seat a portion of the cassette's peripheral wall against said abutment surface when the cassette has been fully inserted into said apparatus through said opening; and selectively operative means for exerting a force against the other major wall surface of the cassette to effect the displacement of the portion of the cassette seated against said abutment surface into alignment with said opening against the force exerted on the cassette by said means for resiliently urging the cassette against said apparatus wall surface, said means for urging the cassette outwardly of said apparatus through said opening being operative at such time to eject at least a portion of the cassette through said opening.

* * * * *